US007965835B2

(12) United States Patent
Park et al.

(10) Patent No.: US 7,965,835 B2

(45) Date of Patent: Jun. 21, 2011

(54) THREE-DIMENSIONAL MULTI-FOLDABLE DEVICE

(75) Inventors: Jongjin Park, Yongin-si (KR); Jeeyoon Lee, Seoul (KR); Jongmin Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 223 days.

(21) Appl. No.: 12/385,812

(22) Filed: Apr. 21, 2009

(65) Prior Publication Data

US 2010/0085697 A1 Apr. 8, 2010

(30) Foreign Application Priority Data

Oct. 2, 2008 (KR) ........................ 10-2008-0097407

(51) Int. Cl.
*H04M 1/00* (2006.01)
*H04M 9/00* (2006.01)

(52) U.S. Cl. ................................ 379/433.13; 455/575.3

(58) Field of Classification Search ............. 379/428.01, 379/433.11, 433.13; 455/575.1, 575.3, 90.3; 361/600, 679.06, 679.07; 348/788; 16/282, 16/283, 287, 288, 302, 366–371
See application file for complete search history.

(56) References Cited

U.S. PATENT DOCUMENTS 5,321,451 A * 6/1994 Olugboji ....................... 353/120
5,873,513 A * 2/1999 Ong ............................ 229/67.1
6,643,124 B1 11/2003 Wilk
6,824,042 B2 * 11/2004 Chu ......................... 229/122.21
6,840,437 B2 * 1/2005 Chen ........................ 229/120.17
2005/0002158 A1 * 1/2005 Olodort et al. ................ 361/683
2005/0088463 A1 4/2005 Schilling
2009/0072015 A1 * 3/2009 Drew et al. ................... 229/102
2010/0041439 A1 * 2/2010 Bullister ....................... 455/566

FOREIGN PATENT DOCUMENTS

GB 2 436 039 9/2007

OTHER PUBLICATIONS

Search Report for European patent application No. 09165676.9 dated Jan. 27, 2010.

* cited by examiner

*Primary Examiner* — Tuan D Nguyen
(74) *Attorney, Agent, or Firm* — Harness, Dickey & Pierce, P.L.C.

(57) ABSTRACT

Disclosed is a three-dimensional (3D) multi-foldable device. The three-dimensional (3D) multi-foldable device includes at least four units, each unit including a center panel with two parallel edges and a pair of wing panels, the wing panels being rotatable by 180 degrees about the two parallel edges of their respective center panels, the parallel edges acting as rotation axes for the pair of wing panels. The rotation axes of the first and second units are perpendicular to the rotation axes of the third and fourth units. At least some portions of the pair of third wing panels are combined with the first and second wing panels at one side of the pairs of the first and second wing panels. At least some portions of the pair of the fourth wing panels are combined with the first and second wing panels at the other side of the pairs of the first and second wing panels.

20 Claims, 11 Drawing Sheets

IMAGE

THREE-DIMENSIONAL MULTI-FOLDABLE DEVICE

CROSS-REFERENCE TO RELATED APPLICATION

This application claims priority under 35 U.S.C. §119 to Korean Patent Application No. 10-2008-0097407, filed on Oct. 2, 2008, in the Korean Intellectual Property Office (KIPO), the entire contents of which are herein incorporated by reference.

BACKGROUND

1. Field

Example embodiments relate to a portable device, and more particularly, to a three-dimensional (3D) multi-foldable device transformable into various forms by rotating wing panels by 180° about parallel rotation axes.

2. Description of the Related Art

Devices, for example, portable radios and portable CD players, have been used for a long time due to their convenient portability, and one or more portable devices as portable mobile communication terminals are popular due to the development of the mobile communication industry.

Portable devices are becoming smaller, slimmer, and lighter in consideration of the portability. These portable devices may be representatively divided into a folder type portable device, in which a cover rotates about a rotation axis so as to open or shut with respect to a body, and a slider type portable device, in which a cover slides along a body so as to open or shut the portable device.

However, as the portable devices are becoming multifunctional, for example, as in camera phones, game phones, and digital multimedia broadcasting (DMB) phones capable of implementing various functions in a single device, typical folder-type or slider-type portable devices cannot satisfy the current demands for functional transformation due to their physical restrictions.

For example, folder-type or slider-type devices may include functional keys on one surface of a body and a display panel on one surface of a cover, and thus are not inconvenient as mobile phones or MPEG audio layer-3 (MP3) players. However, as DMB players or cameras, the folder-type or slider-type devices may not satisfy the users' demands for larger display panels. If larger display panels are used in order to satisfy the users' demands, the overall sizes of the folder-type or slider-type devices increases, thereby reducing their portability and holdability.

Also, as interests in health increase, portable medical devices for checking blood pressure, body temperature, pulse rate, and/or blood glucose level, are being used. The portable medical devices need to be combined with portable mobile communication devices in order to implement ubiquitous health care (U-healthcare) systems for remotely receiving medical services by transmitting results determined with the portable medical devices.

However, due to insufficient use of space, a portable medical device for checking a patients needs, for example, blood pressure, and/or blood glucose level, may not be realized as a typical folder-type or slider-type portable device.

SUMMARY

Example embodiments include a three-dimensional (3D) multi-foldable device having various designs according to functions desired by a user. Example embodiments include a 3D multi-foldable device transformable into various forms by simply rotating wing panels by 180° about two parallel rotation axes. Example embodiments include a 3D multi-foldable device in which various portable devices may be implementable as a single device.

Example embodiments include a 3D multi-foldable device capable of firmly maintaining its changed form by using a magnetic force. Example embodiments include a 3D multi-foldable device connectable to one or more other 3D multi-foldable devices by using a magnetic force. Example embodiments include a 3D multi-foldable device having high space usability in a small and slim size.

Additional aspects will be set forth in part in the description which follows and, in part, will be apparent from the description, or may be learned by practice of example embodiments.

In accordance with example embodiments, a three-dimensional (3D) multi-foldable device may include a first unit having a first center panel and a pair of first wing panels. The pair of first wing panels may be rotatable by 180° about two parallel edges of the first center panel. The two parallel edges of the first center panel may act as rotation axes for the pair of first wing panels. The example three-dimensional (3D) multi-foldable device may also include a second unit having a second center panel and a pair of second wing panels. The pair of second wing panels may be rotatable by 180° about two parallel edges of the second center panel. The two parallel edges of the second center panel may act as rotation axes for the pair of second wing panels. In example embodiments the rotation axes of the second unit may be identical to the rotation axes of the first unit. The example three-dimensional (3D) multi-foldable device may also include a third unit having a third center panel and a pair of third wing panels. The pair of third wing panels may be rotatable by 180° about two parallel edges of the third center panel. The two parallel edges of the third center panel may act as rotation axes for the pair of third wing panels. The example three-dimensional (3D) multi-foldable device may also include a fourth unit having a fourth center panel and a pair of fourth wing panels. The pair of fourth wing panels may be rotatable by 180° about two parallel edges of the fourth center panel. The two parallel edges of the fourth center panel may act as rotation axes for the pair of fourth wing panels. In example embodiments the rotation axes of the fourth unit may be identical to the rotation axes of the third unit. In accordance with example embodiments, the rotation axes of the first and second units may be perpendicular to the rotation axes of the third and fourth units, and at least some portions of the pair of the third wing panels may be combined with the first and second wing panels at one side of the pairs of the first and second wing panels, and at least some portions of the pair of the fourth wing panels may be combined with the first and second wing panels at the other side of the pairs of the first and second wing panels.

In accordance with example embodiments, a three-dimensional (3D) multi-foldable device may include at least four units, each of the at least four units may include a center panel with two parallel edges and a pair of wing panels. The wing panels may be rotatable by 180 degrees about the two parallel edges of their respective center panels. The parallel edges may act as rotation axes for their respective pairs of wing panels. In accordance with example embodiments, the rotation axes of the first and second units may be perpendicular to the rotation axes of the third and fourth units, and at least some portions of the pair of third wing panels may be combined with the first and second wing panels at one side of the pairs of the first and second wing panels. In accordance with example embodiments, at least some portions of the pair of the fourth wing panels may be combined with the first and second wing panels at the other side of the pairs of the first and second wing panels.

In accordance with example embodiments, a three-dimensional (3D) multi-foldable device may include a first unit having a first center panel with a first edge and a second edge, a first wing panel, and a second wing panel. The first and second edges may be parallel to each other. The first wing panel may be attached to the first edge of the first center panel such that the first wing panel may be rotated about the first edge by 180 degrees. The second wing panel may be attached to the second edge of the first center panel such that the second wing panel may be rotated about the second edge by 180 degrees. The first edge may act as a first rotation axis for the first wing panel and the second edge may act as a second rotation axis for the second wing panel. The three-dimensional (3D) multi-foldable device may also include a second unit adjacent to the first unit. The second unit may have a second center panel with a third edge and a fourth edge, a third wing panel, and a fourth wing panel. The third and fourth edges may be parallel to each other. The third wing panel may be attached to the third edge of the second center panel such that the third wing panel may be rotated about the third edge by 180 degrees. The fourth wing panel may be attached to the fourth edge of the second center panel such that the fourth wing panel may be rotated about the fourth edge by 180 degrees. The third edge may act as a rotation axis (which may be coincident with the first rotation axis) for the third wing panel. The fourth edge may act as a rotation axis (which may be coincident with the second rotation axis) for the fourth wing panel. The three-dimensional (3D) multi-foldable device may also include a third unit adjacent to the first unit and the second unit. The third unit may have a third center panel with a fifth edge and a sixth edge, a fifth wing panel, and a sixth wing panel. The fifth and sixth edges may be parallel to each other. The fifth wing panel may be attached to the fifth edge of the third center panel such that the fifth wing panel may be rotated about the fifth edge by 180 degrees. The sixth wing panel may be attached to the sixth edge of the third center panel such that the sixth wing panel may be rotated about the sixth edge by 180 degrees. The fifth edge may act as a third rotation axis for the fifth wing panel and the sixth edge may act as a fourth rotation axis for the sixth wing panel. In example embodiments, the fifth axis and sixth axis may be perpendicular with the first rotation axis. The three-dimensional (3D) multi-foldable device may also include a fourth unit adjacent to the third unit. The fourth unit may have a fourth center panel with a seventh edge and an eighth edge, a seventh wing panel, and an eighth wing panel. The seventh and eighth edges may be parallel to each other. The seventh wing panel may be attached to the seventh edge of the fourth center panel such that the seventh wing panel may be rotated about the seventh edge by 180 degrees. The eighth wing panel may be attached to the eighth edge of the fourth center panel such that the eighth wing panel may be rotated about the eighth edge by 180 degrees. The seventh edge may act as a rotation axis (which may be coincident with the third rotation axis) for the seventh wing panel. The eighth edge may act as a rotation axis (which may be coincident with the fourth rotation axis) for the eighth wing panel. In accordance with example embodiments, at least a portion of the first wing panel may be combined with a portion of the fifth wing panel, a portion of the second wing panel may be combined with a portion of the seventh wing panel, a portion of the third wing panel may be combined with a portion of the sixth wing panel, and a portion of the fourth wing panel may be combined with a portion of the eighth wing panel.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
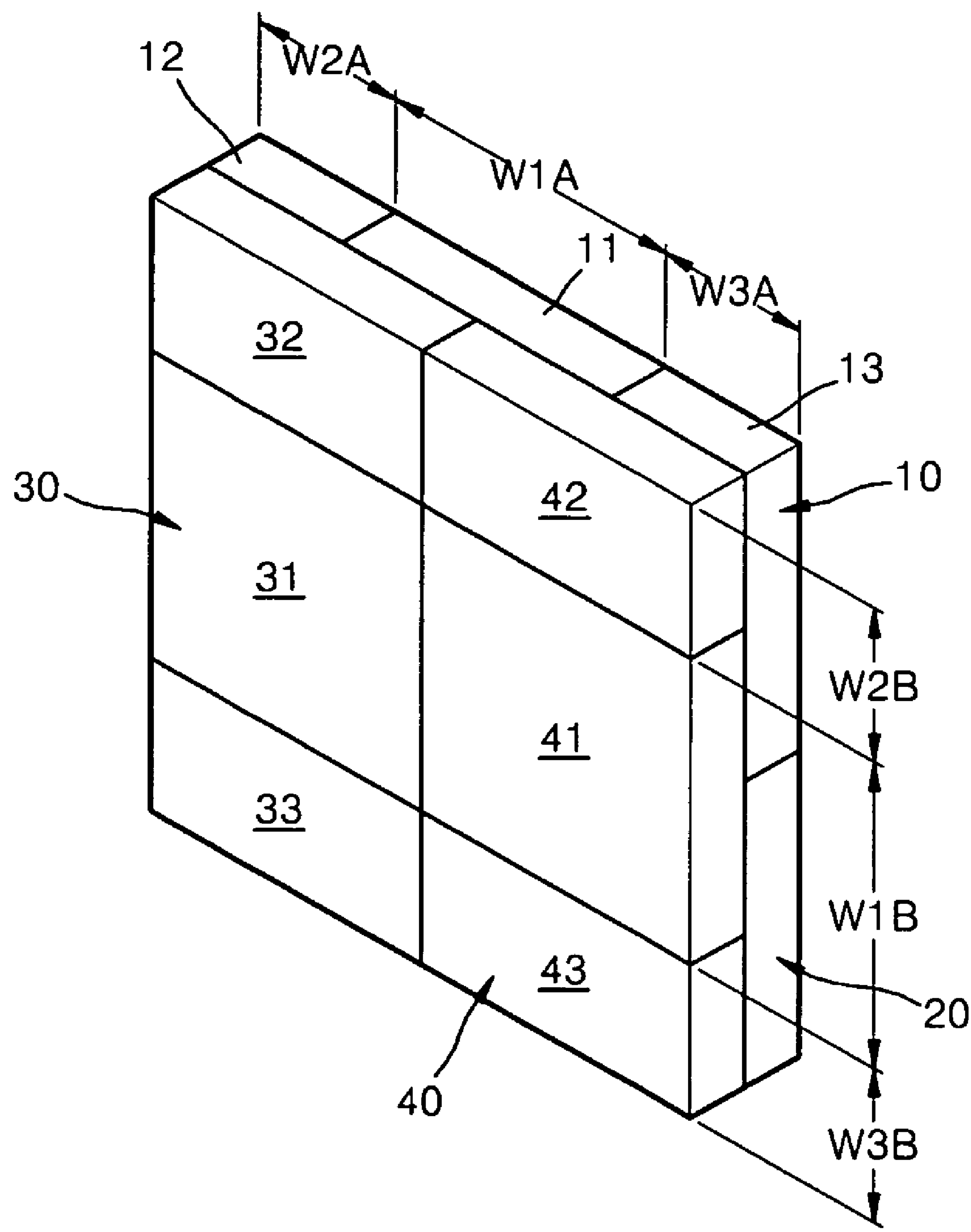
FIG. 1 is a schematic perspective view of a three-dimensional (3D) multi-foldable device according to example embodiments.

Example embodiments will now be described more fully with reference to the accompanying drawings, in which example embodiments are shown. Example embodiments may, however, be embodied in different forms and should not be construed as limited to the embodiments set forth herein. Rather, these embodiments are provided so that this disclosure will be thorough and complete, and will fully convey the scope of example embodiments to those skilled in the art. In the drawings, the sizes of components may be exaggerated for clarity.

It will be understood that when an element or layer is referred to as being "on", "connected to", or "coupled to" another element or layer, it can be directly on, connected to, or coupled to the other element or layer or intervening elements or layers that may be present. In contrast, when an element is referred to as being "directly on", "directly connected to", or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. Thus, a first element, component, region, layer, or section discussed below could be termed a second element, component, region, layer, or section without departing from the teachings of example embodiments.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configuration formed on the basis of manufacturing processes. Therefore, regions exemplified in figures have schematic properties and shapes of regions shown in figures exemplify specific shapes or regions of elements, and do not limit example embodiments.

Figure 2:
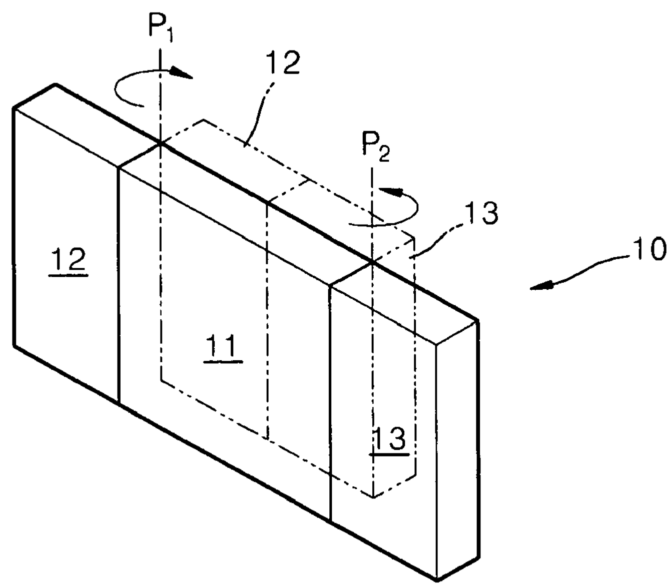
FIG. 2 is a schematic perspective view for describing a method of rotating first wing panels of a first unit illustrated in FIG. 1, according to example embodiments.

FIG. 1 is a schematic perspective view of a three-dimensional (3D) multi-foldable device according to example embodiments. FIG. 2 is a schematic perspective view for describing a method of rotating first wing panels 12 and 13 of first unit 10 illustrated in FIG. 1, according to example embodiments.

Referring to FIGS. 1 and 2, the 3D multi-foldable device may include first through fourth units 10, 20, 30, and 40. The first through fourth units 10, 20, 30, and 40 may include first through fourth center panels 11, 21, 31, and 41 (see also FIGS. 3A and 3B) and pairs of first through fourth wing panels 12 and 13, 22 and 23, 32 and 33, and 42 and 43 (see also FIGS. 3A and 3B). The pairs of first through fourth wing panels 12 and 13, 22 and 23, 32 and 33, and 42 and 43 may be rotatable by 180° about two parallel edges of the first through fourth center panels 11, 21, 31, and 41. The parallel edges may act as rotation axes P1 and P2, and Q1 and Q2 (see also FIGS. 3A and 3B).

As a representative example, the first unit 10 will be described in more detail. As illustrated in FIG. 2, the first unit 10 may include first center panel 11 and first wing panels 12 and 13. The first wing panels 12 and 13 may be connected to the first center panel 11 and may be rotatable by 180° about two parallel edges of the first center panel 11. The parallel edges of the first center panel 11 may act as the rotation axes P1 and P2.

A bonding material and a flexible polyimide film may be used to attach the first wing panels 12 and 13 to the first center panel 11. The bonding material and polyimide film may be configured so that the first wing panels 12 and 13 may be rotatable by 180° about the two parallel edges of the first center panel 11. As previously stated, the parallel edges may act as the rotation axes P1 and P2 for the wing panels 12 and 13. A flexible printed circuit board (FPCB) may be formed of a flexible material and may be used to transmit electric signals between the first center panel 11 and the first wing panels 12 and 13. Also, magnetic films may be formed under the surfaces of the first center panel 11 and the wing panels 12 and 13. The magnetic films may be located in positions where the center panel 11 and the wing panels 12 and 13 contact each other when the first wing panels 12 and 13 are folded. The magnetic films may help secure the wing panels 12 and 13 against the first center panel 11 after the wing panels 12 and 13 are folded against the center panel 11. The folding and unfolding operations may be repeatedly performed by external forces. However, example embodiments are not limited thereto and any other attaching method may be used to attach the first wing panels 12 and 13 to the first center panel 11 so that the first wing panels 12 and 13 may be rotatable by 180° about the two parallel edges of the first center panel 11, which act as the rotation axes P1 and P2.

In order to firmly maintain a state where the first wing panels 12 and 13 are completely unfolded with respect to the first center panel 11 (see solid lines in FIG. 2) or a state that the first wing panels 12 and 13 are rotated by 180° so as to be completely folded (see dotted lines in FIG. 2), and to allow a user to easily and repeatedly fold and unfold the first wing panels 12 and 13, an attraction between the first wing panels 12 and 13 and the first center panel 11 may be formed. The attraction, for example, may be made by providing magnets having different polarities (for example, a magnet of N polarity and a magnet of S polarity) on at least some portions of surfaces contacting each other. In particular, the magnets may be positioned on portions of surfaces between the first center panel 11 and the first wing panels 12 and 13 where the first wing panels 12 and 13 are unfolded and/or between the first wing panels 12 and 13 and the first center panel 11 when the first wing panels 12 and 13 are folded. Alternatively, the attraction may be formed by providing a magnet on a contacting surface of one of the wing panels 12 and 13 and the center panel 11 and coating a magnetic material that can be attracted by the magnet, on a contacting surface of the other of the wing panels 12 and 13 and the center panel 11 opposite to the contacting surface on which the magnet is provided.

In FIG. 2, the first unit 10 is a rectangle in which a sum of the widths W2A and W3A (see FIG. 1) of the first wing panels 12 and 13 is equal to the width W1A (see FIG. 1) of the first center panel 11. However, the widths W1A, W2A, and W3A are not limited thereto and the sum of the widths W2A and W3A of the first wing panels 12 and 13 may be smaller than the width W1A of the first center panel 11.

Figure 3A:
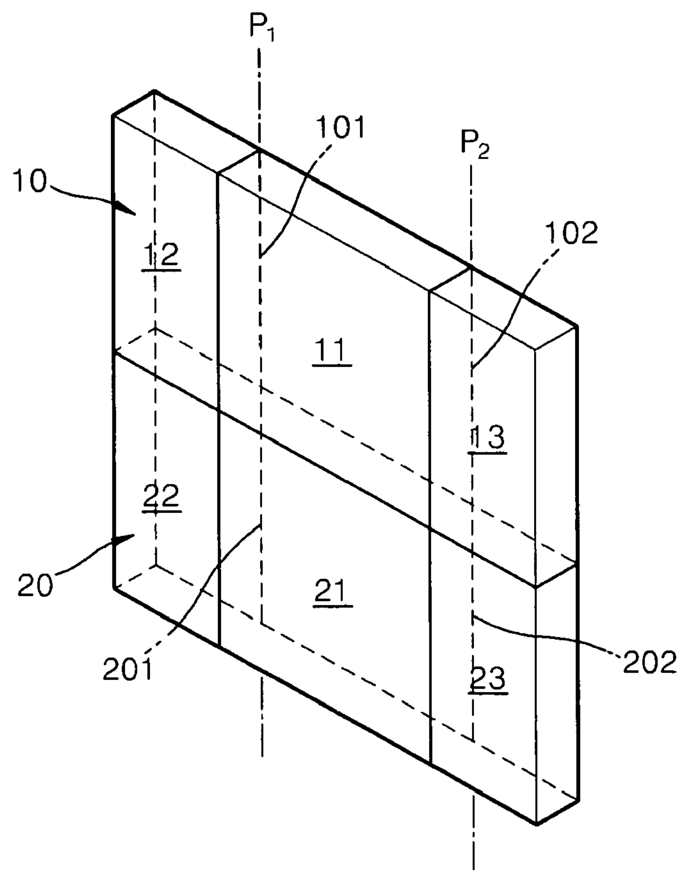
FIGS. 3A and 3B are schematic perspective views for describing a method of assembling the 3D multi-foldable device, according to example embodiments.
Figure 3B:
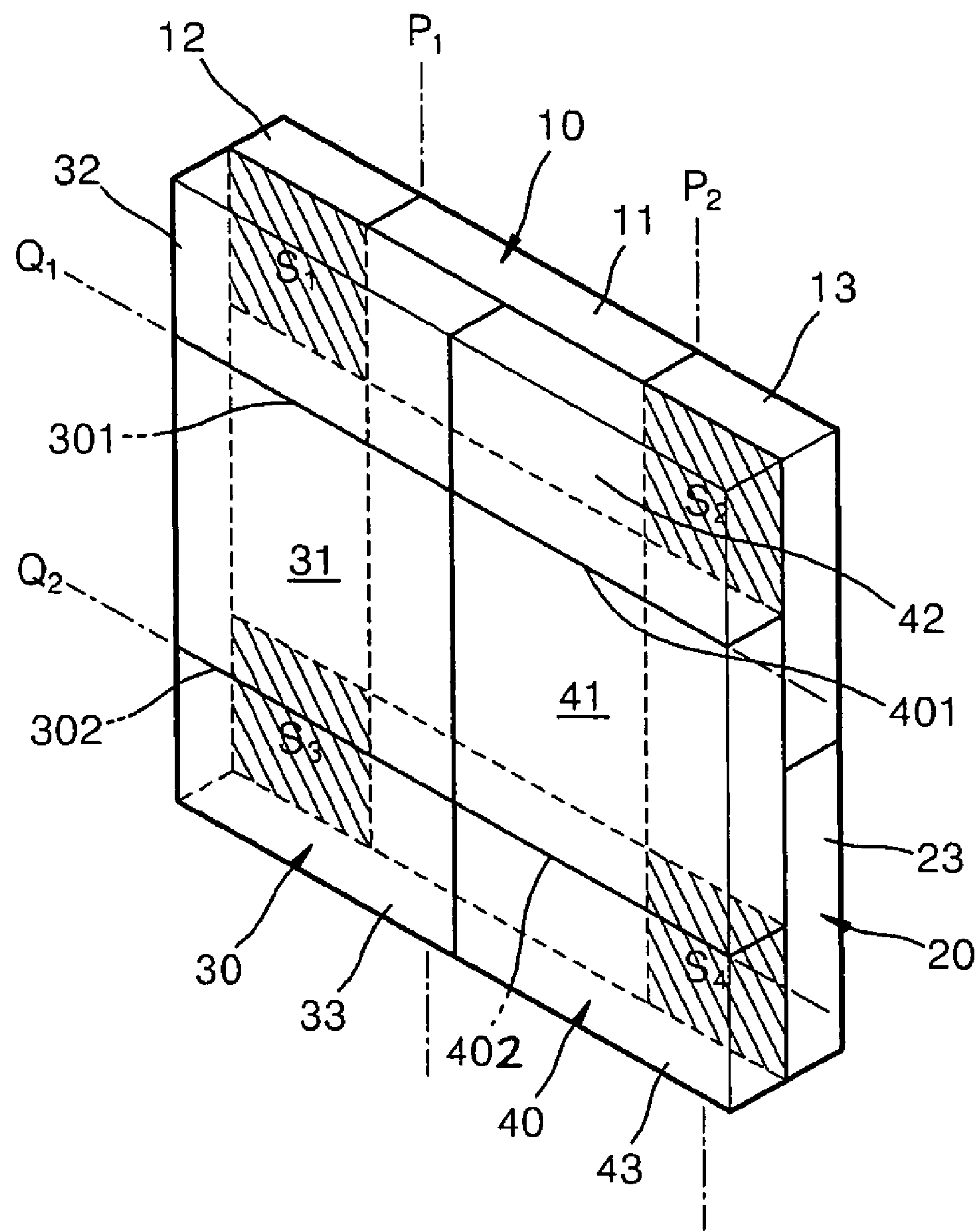

FIGS. 3A and 3B are schematic perspective views for describing a method of assembling the 3D multi-foldable device, according to example embodiments. FIG. 3A shows first and second units 10 and 20 and FIG. 3B shows third and fourth units 30 and 40 that are assembled on one of the surfaces of the first and second units 10 and 20.

As described above with reference to FIG. 1, the 3D multi-foldable device may include the first through fourth units 10, 20, 30, and 40. The first through fourth units may include first through fourth center panels 11, 21, 31, and 41 and each center panel may include a pair of wing panels 12 and 13, 22 and 23, 32 and 33, and 42 and 43, wherein the wing panels 12, 13, 22, 23, 32, 33, 42, and 43 are connected to edges 101, 102, 201, 202, 301, 302, 401, and 402 of the center panels 11, 21, 31, and 41 and the edges serve as rotation axes P1, P2, P3, P4, Q1, Q2, Q3, and Q4.

Stated another way, the multifoldable device illustrated in FIGS. 3A and 3B may include first through fourth units 10, 20, 30, and 40, which include first through fourth center panels 11, 21, 31, and 41 and first through eighth wing panels 12, 13, 22, 23, 32, 33, 42, and 43, attached to first through eighth edges 101, 102, 201, 202, 301, 302, 401, and 402 of the first through fourth center panels 11, 21, 31, and 41. The first through eighth edges 101, 102, 201, 202, 301, 302, 401, and 402 may be arranged such that first and third edges 101 and 201 are coincident with a first rotation axis P1, second and fourth edges 102 and 202 are coincident with a second rotation axis P2, fifth and seventh edges 301 and 401 are coincident with a third rotation axis Q1 and sixth and eighth edges 302 and 402 are coincident with a fourth rotation axis Q2. As shown in the FIGS. 3A and 3B, the first and second rotation axes P1 and P2 are parallel to each other and the third and fourth axes Q1 and Q2 are likewise parallel to each other. Further, the first and second axes P1 and P2 are oriented perpendicular to the third and fourth rotation axes Q1 and Q2. The assembling method thereof will now be described with reference to FIGS. 3A and 3B.

Referring to FIG. 3A, the first unit 10 may include the first center panel 11 and the pair of first wing panels 12 and 13 that may be rotatable by 180° about two parallel edges 101 and 102 of the first center panel 11. The two parallel edges 101 and 102 may act as rotation axes P1 and P2 for the first wing panels 12 and 13. As shown in FIG. 3A, the first unit 10 may be disposed adjacent to the second unit 20. The second unit may include a second center panel 21 and a pair of second wing panels 22 and 23 that may be rotatable by 180° about two parallel edges 201 and 202 of the second center panel 21. The parallel edges 201 and 202 of the second center panel 21 may also act as the rotation axes P1 and P2 for the pair of second wing panels 22 and 23. As shown in FIG. 3A, the first and second units 10 and 20 may be arranged in a line on the rotation axes P1 and P2.

The first and second units 10 and 20 may contact each other without being combined. Alternatively, the first and second units 10 and 20 may be separated from each other with an interval. If the first and second units 10 and 20 contact each other, an attraction may be formed by providing magnets having different polarities on at least some portions of contacting surfaces between the first and second units 10 and 20. The attraction may also be provided by installing a magnet on a contacting surface of one of the units 10 and 20 and coating a magnetic material that can be attracted by the magnet, on a contacting surface of the other unit 10 and 20 opposite to the contact surface on which the magnet is provided. As such, the first and second units 10 and 20 may firmly contact each other and may be separated from each other according to a transformation.

Referring to FIG. 3B, after the first and second units 10 and 20 are disposed, the third and fourth units 30 and 40 may be disposed on one of the surfaces of the first and second units 10 and 20. The third unit 30 may include a third center panel 31 and a pair of third wing panels 32 and 33 that may be rotatable by 180° about two parallel edges 301 and 302 of the third center panel 31. The parallel edges 301 and 302 of the third center panel 31 may act as rotation axes Q1 and Q2 for the third pair of wing panels 32 and 33. The fourth unit 40 may include a fourth center panel 41 and a pair of fourth wing panels 42 and 43 that may be rotatable by 180° about two parallel edges 401 and 402 of the fourth center panel 41. The two parallel edges 401 and 402 may act as the rotation axes for the fourth pair of wing panels 42 and 43 such that the rotation axes for the fourth pair of wing panels 42 and 43 may be coincident with the rotation axes Q1 and Q2.

The third and fourth units 30 and 40 may be arranged in a line so that the parallel edges 301, 302, 401 and 402 of the third and fourth units 30 and 40 which attach to the third and fourth pair of wing panels 32 and 33 and 42 and 43 lie on one of the rotation axes Q1 and Q2. As shown in FIG. 3B, the rotation axes Q1 and Q2 of the third and fourth units 30 and 40 may be perpendicular to the rotation axes P1 and P2 of the first and second units 10 and 20.

Similar to the first and second units 10 and 20, the third and fourth units 30 and 40 may contact each other without being combined. Alternatively, the third and fourth units 30 and 40 may be separated from each other with an interval. If the third and fourth units 30 and 40 contact each other, an attraction may be formed by providing magnets having different polarities on at least some portions of contacting surfaces, or by providing a magnet on a contacting surface of one of the third and fourth units 30 and 40 and coating a magnetic material that can be attracted by the magnet, on a contacting surface opposite to the contacting surface on which the magnet is provided on the other of the third and fourth units 30 and 40. As such, the third and fourth units 30 and 40 may firmly contact each other and may be separated from each other according to a transformation.

At least some portions of the third unit 30 may separately overlap with the first and second wing panels 12 and 22 on one side of the pairs of the first and second wing panels 12 and 13 and 22 and 23. The third unit 30 may be combined with the first and second units 10 and 20 on surfaces S1 and S3 where the first and second wing panels 12 and 22 overlap with the third wing panels 32 and 33. Also, at least some portions of the fourth unit 40 may separately overlap with the first and second wing panels 13 and 23 on the other side of the pairs of the first and second wing panels 12 and 13, and 22 and 23. The fourth unit 40 may be combined with the first and second units 10 and 20 on surfaces S2 and S4 where the first and second wing panels 13 and 23 overlap with the fourth wing panels 42 and 43.

As such, the first through fourth units 10, 20, 30, and 40 may be assembled into the 3D multi-foldable device illustrated in FIG. 1 and electric signals may be transmitted between the first through fourth units 10, 20, 30, and 40 through the surfaces S1, S2, S3, and S4.

FIGS. 4A through 4D are schematic perspective views for describing a method of transforming the 3D multi-foldable device, according to example embodiments. FIGS. 5A through 5D are schematic perspective views for describing a method of transforming the 3D multi-foldable device, according to example embodiments.

A method of transforming the 3D multi-foldable device that may be assembled as described above with reference to FIGS. 3A and 3B will now be described.

Figure 4A:
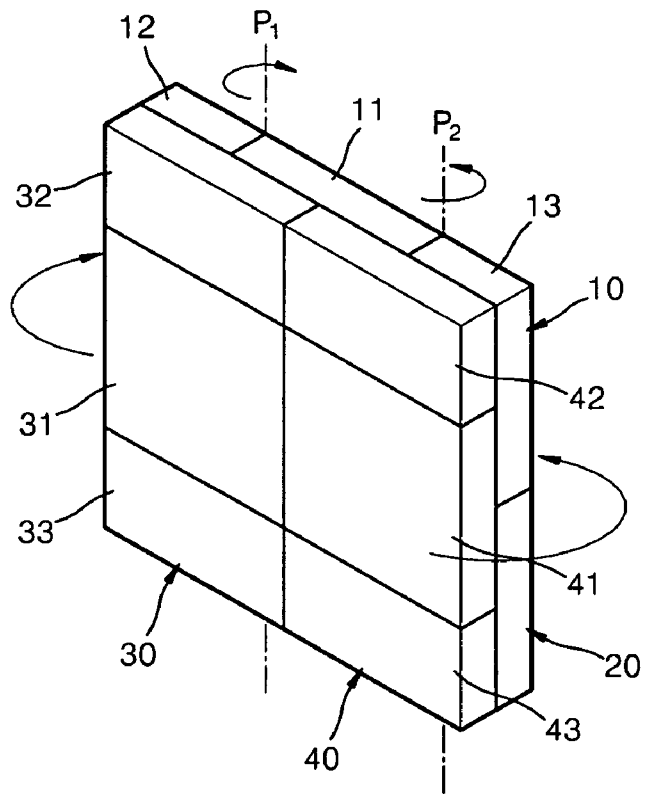
FIGS. 4A through 4D are schematic perspective views for describing a method of transforming the 3D multi-foldable device, according to example embodiments.
Figure 4B:
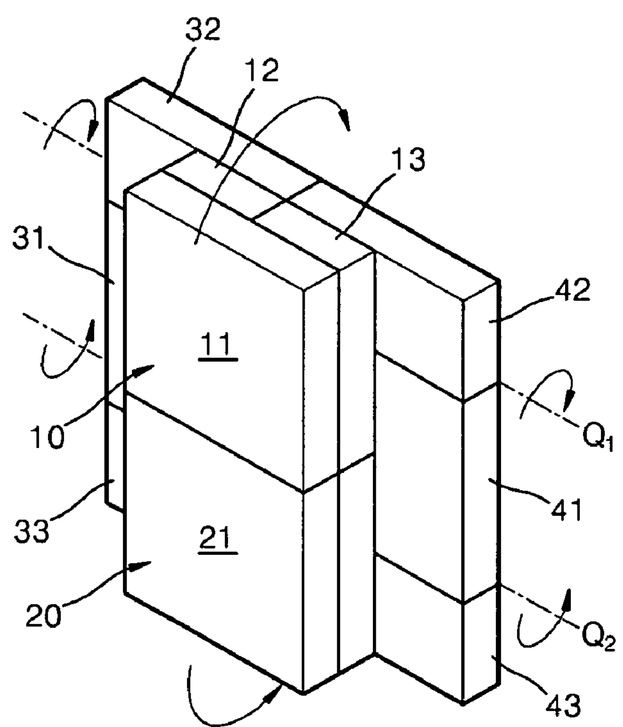

Referring to FIG. 4A, front surfaces of the third and fourth units 30 and 40 may be exposed (Form 1). From Form 1, if the pairs of first and second wing panels 12 and 13, and 22 and 23 rotate by 180° about the rotation axes P1 and P2 of the first and second units 10 and 20, front surfaces of the first and second units 10 and 20 and portions of rear surfaces of the third and fourth units 30 and 40, which contacted the first and second units 10 and 20, may be exposed as illustrated in FIG. 4B (Form 2).

Figure 4C:
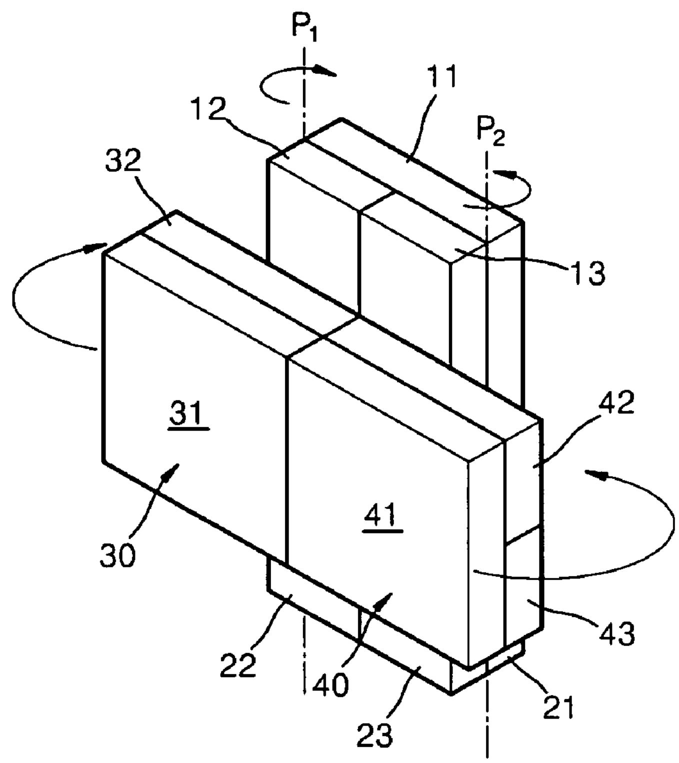

From Form 2, if the pairs of third and fourth wing panels 32 and 33, and 42 and 43 rotate by 180° about rotation axes Q1 and Q2 of the third and fourth units 30 and 40, rear surfaces of third and fourth center panels 31 and 41 and some portions of rear surfaces of the pairs of the first and second wing panels 12 and 13, and 22 and 23, which contacted the third and fourth center panels 31 and 41, may be exposed so as to form an overall cross shape as illustrated in FIG. 4C (Form 3).

Figure 4D:
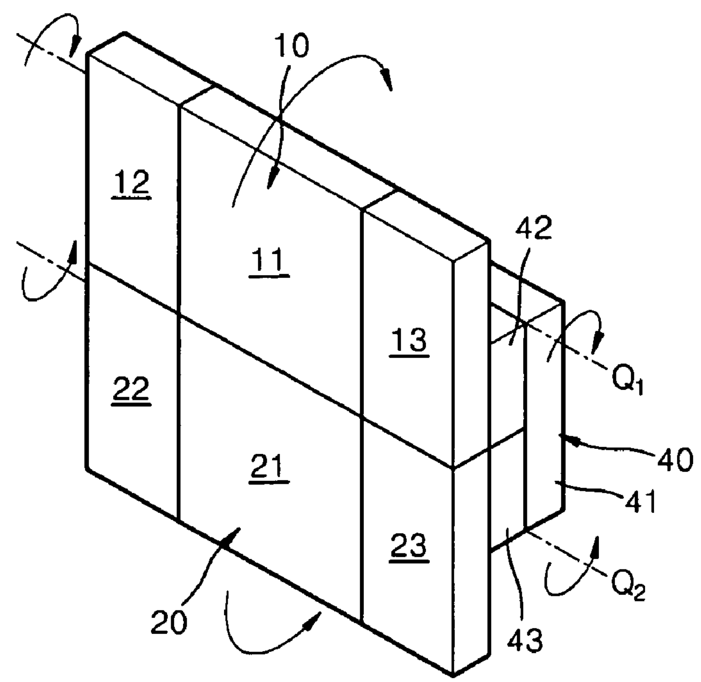

From Form 3, if the pairs of the first and second wing panels 12 and 13, and 22 and 23 rotate by 180° about the rotation axes P1 and P2 of the first and second units 10 and 20, rear surfaces of the first and second units 10 and 20 may be exposed as illustrated in FIG. 4D (Form 4). From Form 4, if the pairs of the third and fourth wing panels 32 and 33, and 42 and 43 rotate by 180° about the rotation axes Q1 and Q2 of the third and fourth units 30 and 40, the 3D multi-foldable device may return to Form 1 illustrated in FIG. 4A.

As described above, the 3D multi-foldable device may be transformed into four forms by sequentially and repeatedly rotating the pairs of the first and second wing panels 12 and 13, and 22 and 23 by 180° about the rotation axes P1 and P2 of the first and second units 10 and 20 and rotating the pairs of the third and fourth wing panels 32 and 33, and 42 and 43 by 180° about the rotation axes Q1 and Q2 of the third and fourth units 30 and 40.

In order to firmly maintain a changed form, an attraction may be formed by providing magnets having different polarities on at least some portions of surfaces that newly contact each other due to a rotation, or by providing a magnet on a contacting surface and coating a magnetic material that can be attracted by the magnet, on a contacting surface opposite to the contacting surface on which the magnet is provided. As such, the first through fourth units 10, 20, 30, and 40 may firmly contact each other and may be separated from each other according to a transformation.

In FIGS. 1, 2, 3A and 3B, and 4A through 4D, the first through fourth units 10, 20, 30, and 40 are rectangles in which the widths W1A and W1B of the first through fourth center panels 11, 21, 31, and 41 are equal to the sums of W2A+W3A and W2B+W3B of their corresponding pairs of the first through fourth wing panels 12 and 13, 22 and 23, 32 and 33, and 42 and 43. When all of the first through fourth units 10, 20, 30, and 40 are unfolded, the third and fourth units 30 and 40 may completely overlap with the first and second units 10 and 20. Thus, space usability according to transformations may be maximized or increased.

Figure 5A:
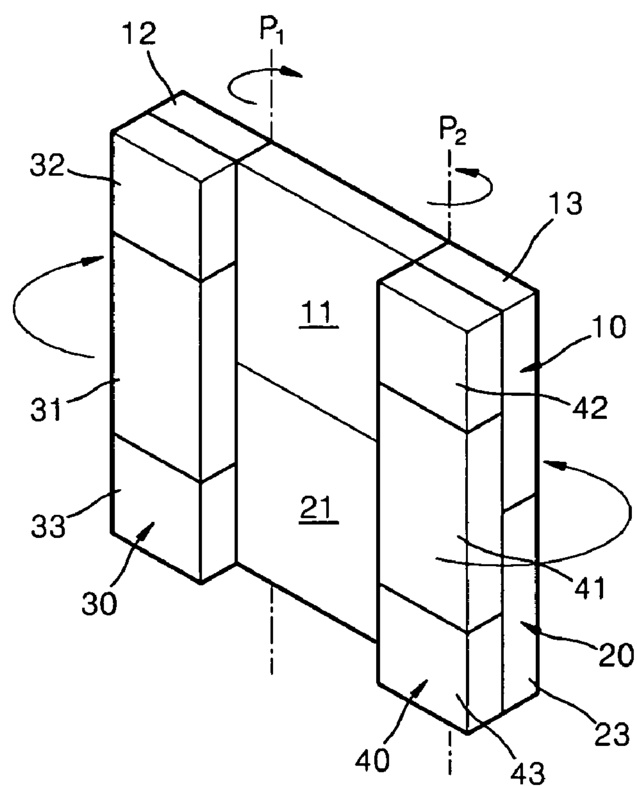
FIGS. 5A through 5D are schematic perspective views for describing a method of transforming the 3D multi-foldable device, according to example embodiments.
Figure 5B:
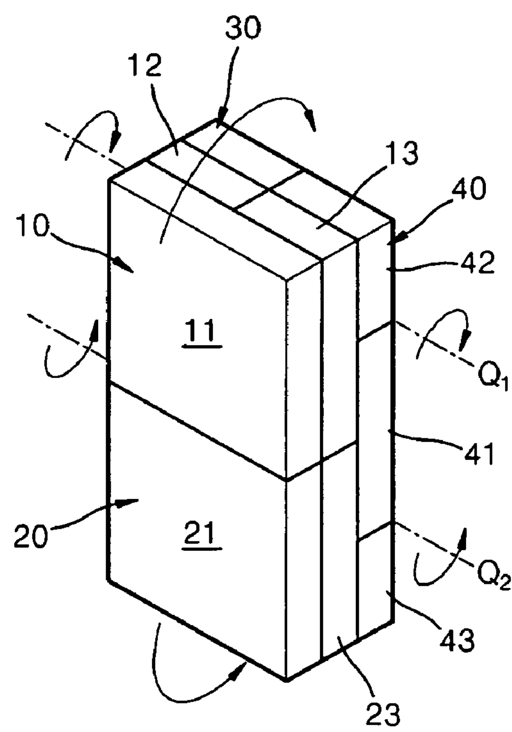
Figure 5C:
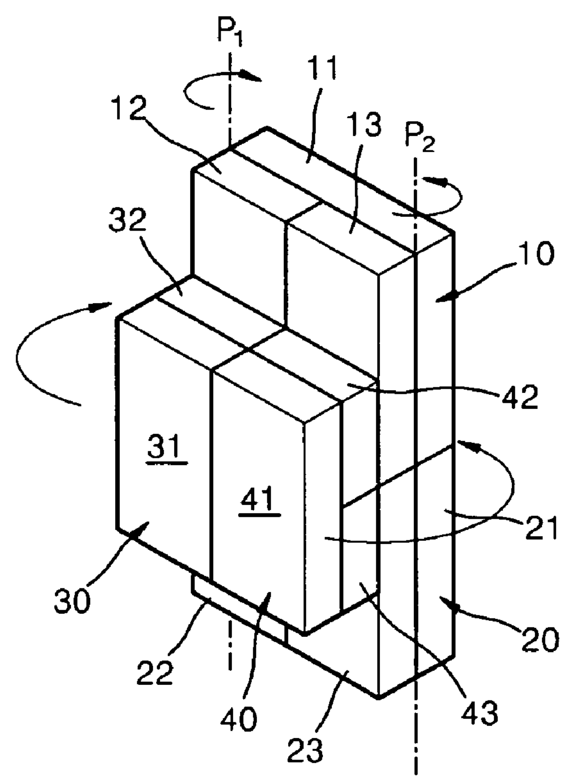
Figure 5D:
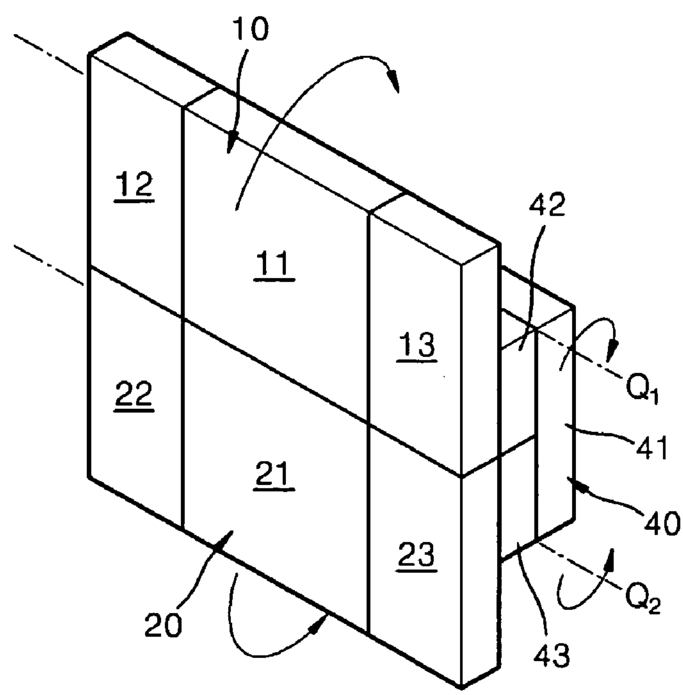

However, in order to further improve portability and holdability, a 3D multi-foldable device may be formed as illustrated in FIG. 5A. In FIG. 5A, when all of the first through fourth units 10, 20, 30, and 40 are unfolded, the third unit 30 may overlap only with the first and second wing panels 12 and 22 on one side of the pairs of the first and second wing panels 12 and 13, and 22 and 23 and the fourth unit 40 may overlap only with the first and second wing panels 13 and 23 on the other side of the pairs of the first and second wing panels 12 and 13, and 22 and 23.

In FIGS. 5A through 5D, the 3D multi-foldable device may have sufficient utilizing space as in FIGS. 4A through 4D. Also, the 3D multi-foldable device may further improve portability and holdability as illustrated in FIGS. 5A through 5D.

The 3D multi-foldable device may utilize all surfaces, except for the surfaces S1, S2, S3, and S4 (see FIG. 3B) where the first and second units 10 and 20 overlap and are combined with the third and fourth units 30 and 40. For example, all of the front and rear surfaces of the first through fourth units 10, 20, 30, and 40 may be utilized as a display panel, for example, a touch screen for providing special functions or a so-called 'display panel having a haptic function' for representing 3D textures.

In addition, the 3D multi-foldable device may include an antenna, a speaker, a wireless charger, a universal serial bus (USB) device, a clip-type Bluetooth device, a blood pressure meter, a blood glucose meter, and a thermometer, as well being utilized as a display panel. Thus, the 3D multi-foldable device may function as at least one of a mobile phone, a game player, an MPEG audio layer-3 (MP3) player, a digital multimedia broadcasting (DMB) player, a bio healthcare device, a remote controller, a camera, or a camcorder, by rotating wing panels by 180° about parallel rotation axes.

FIGS. 6A through 6D are schematic perspective views of the 3D multi-foldable device illustrated in FIGS. 5A through 5D, which may be implemented as a mobile phone, an MP3 player, a DMB player, according to example embodiments. FIGS. 6A through 6D respectively correspond to FIGS. 5A through 5D and thus will be described in conjunction with FIGS. 5A through 5D.

Figure 6A:
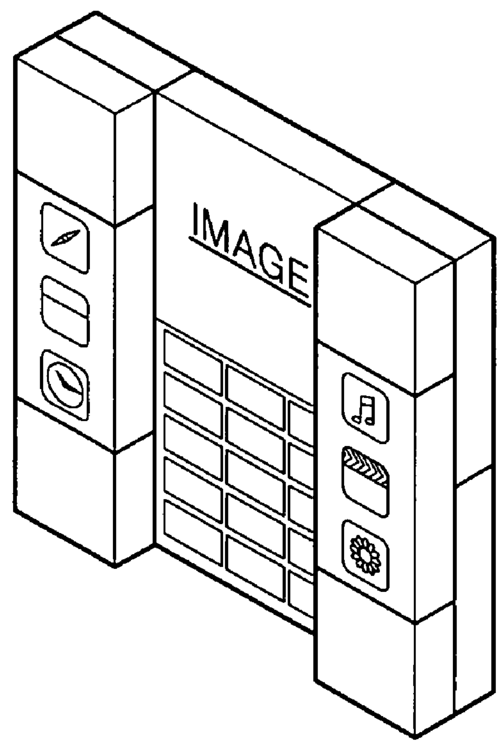
FIGS. 6A through 6D are schematic perspective views of the 3D multi-foldable device illustrated in FIGS. 5A through 5D, which may be implemented as a mobile phone, an MPEG audio player-3 (MP3) player, and/or a digital multimedia broadcasting (DMB) player, according to example embodiments.
Figure 6B:
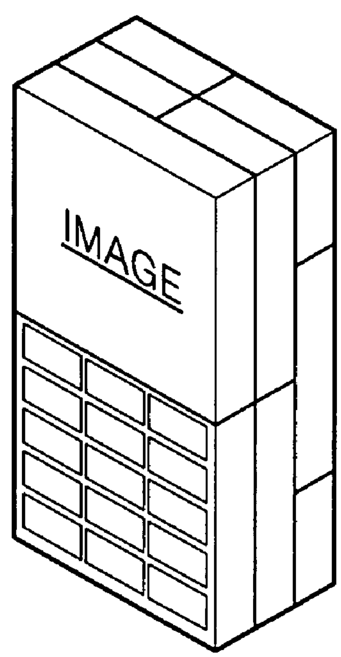
Figure 6C:
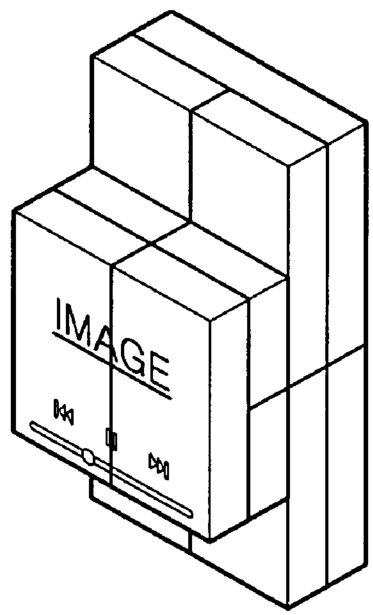
Figure 6D:
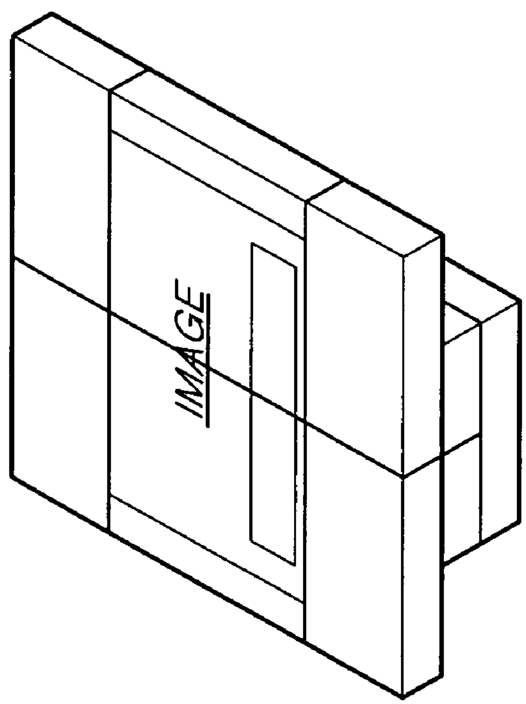

As illustrated in FIG. 6A, various functions may be provided on the third and fourth center panels 31 and 41 and the pairs of the third and fourth wing panels 32 and 33, and 42 and 43 of the third and fourth units 30 and 40 may be utilized, and video calls may be performed by using a camera facing forward. When used as a normal mobile phone and/or an MP3 player, the 3D multi-foldable device may be transformed into bar-type simple forms as illustrated in FIGS. 6B and 6C. When viewing a video image, the 3D multi-foldable device may be transformed as illustrated in FIG. 6D so as to provide a larger screen.

FIGS. 7A through 7D are schematic perspective views of the 3D multi-foldable device illustrated in FIGS. 4A through 4D, which may be implemented as a mobile phone, a game player, a DMB player, according to example embodiments. FIGS. 7A through 7D respectively correspond to FIGS. 4A through 4D and thus will be described in conjunction with FIGS. 4A through 4D.

Figure 7A:
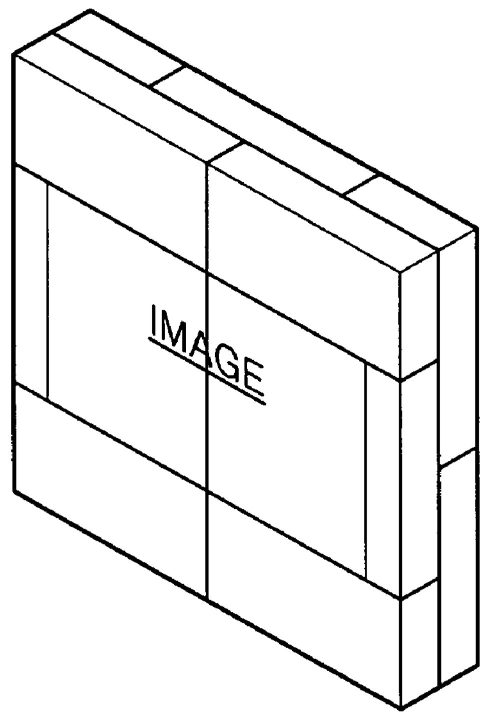
FIGS. 7A through 7D are schematic perspective views of the 3D multi-foldable device illustrated in FIGS. 4A through 4D, which may be implemented as a mobile phone, a game player, and/or a DMB player, according to example embodiments.
Figure 7B:
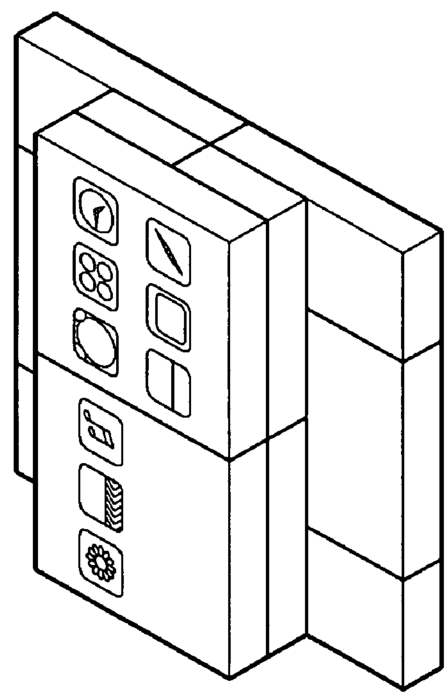
Figure 7C:
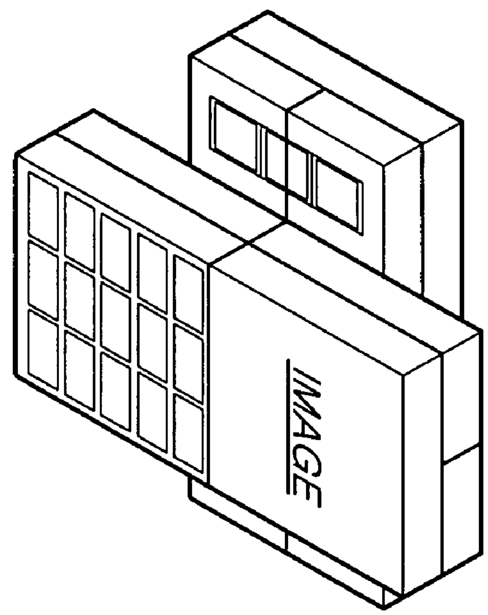
Figure 7D:
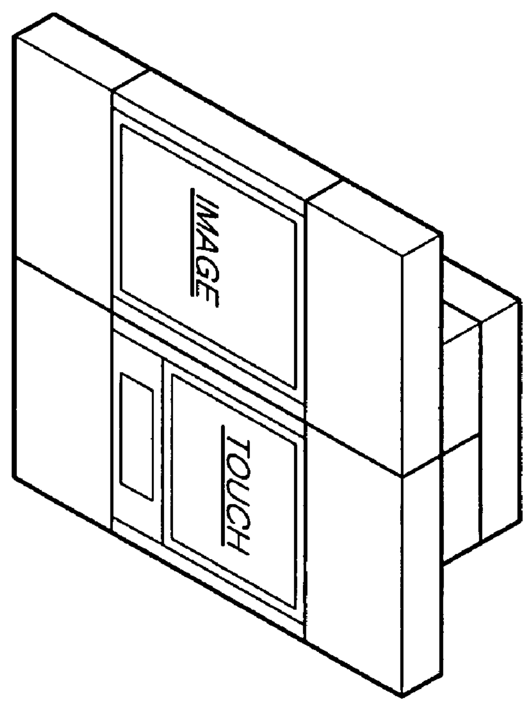

The 3D multi-foldable device may have various designs according to a user's preference and functions of devices to be implemented through the 3D multi-foldable device. For example, when the 3D multi-foldable device is used as a mobile phone, as in the form illustrated in FIG. 4B, a configuration for the mobile phone may be formed on front surfaces of the first and second center panels 11 and 21 of the first and second units 10 and 20, as illustrated in FIG. 7B. When the 3D multi-foldable device is used as a mobile phone, as in the form illustrated in FIG. 4C, a configuration for the mobile phone may be formed on front surfaces of the third and fourth center panels 31 and 41 of the third and fourth units 30 and 40, as illustrated in FIG. 7C. Also, the 3D multi-foldable device may rotate by 90° in a counterclockwise direction so as to locate the third unit 30 on the top and the fourth unit 40 on the bottom of the 3D multi-foldable device.

Furthermore, in addition to a variable design, the 3D multi-foldable device may be customized by adding a user-required configuration, for example, a blood pressure meter for a hypertensive subject or a blood glucose meter for a diabetic, on a panel.

In addition, two or more 3D multi-foldable devices may be connected to each other. In example embodiments, the 3D multi-foldable devices may be connected to each other by providing a magnet on a contacting surface and coating a magnetic material that can be attracted by the magnet, on a contacting surface opposite to the contacting surface on which the magnet is provided. The 3D multi-foldable devices may exchange data by performing infrared communication or wireless communication therebetween. A video image may be viewed on a large screen by connecting the 3D multi-foldable devices to each other.

As described above, according to the example embodiments, a 3D multi-foldable device may have various designs according to functions desired by a user, may be transformed into various forms by simply rotating wing panels by 180° about two parallel rotation axes, and may be implemented as various portable devices in a single device. Also, the 3D multi-foldable device may firmly maintain its changed form and be connected to one or more other 3D multi-foldable devices based on a magnetic force, and may have higher space usability in a small and slim size.

While example embodiments have been particularly shown and described with reference to example embodiments thereof, it will be understood by those of ordinary skill in the art that various changes in form and details may be made therein without departing from the spirit and scope of the following claims.

What is claimed is:

1. A three-dimensional (3D) multi-foldable device comprising:

at least four units, each of the at least four units including a center panel with two parallel edges and a pair of wing panels, the wing panels of each unit being rotatable by 180 degrees about the two parallel edges of their respective center panels, the parallel edges acting as rotation axes for the pair of wing panels, wherein the rotation axes of the first and second units are coincident and the rotation axes of the third and fourth units are coincident, and the rotation axes of the first and second units are perpendicular to the rotation axes of the third and fourth units, and at least some portions of the pair of third wing panels are combined with the first and second wing panels on one side of the pairs of the first and second wing panels, and at least some portions of the pair of the fourth wing panels are combined with the first and second wing panels on the other side of the pairs of the first and second wing panels.

2. The 3D multi-foldable device of claim 1, wherein each of the first through fourth units is a rectangle in which a width of each of the first through fourth center panels is equal to a sum of the widths of its corresponding pair of the first through fourth wing panels, and the third and fourth units completely overlap with the first and second units when the 3D multi-foldable device is in an unfolded condition.

3. The 3D multi-foldable device of claim 1, wherein, each of the first through fourth units is a rectangle and a width of each of the first through fourth center panels is equal to a sum of widths of a corresponding pair of the first through fourth wing panels, and the third unit overlaps only with first and second wing panels at one side of the pairs of the first and second wing panels and the fourth unit overlaps only with first and second wing panels at the other side of the pairs of the first and second wing panels when the 3D multi-foldable device is in an unfolded condition.

4. The 3D multi-foldable device of claim 1, further comprising:

magnetic materials on at least some portions of contacting surfaces between each of the first through fourth center panels and a corresponding pair of the first through fourth wing panels.

5. The 3D multi-foldable device of claim 1, further comprising:

a magnet on one side and a magnetic material on another side of the 3D multi-foldable device so that a plurality of 3D multi-foldable devices are connectable to each other in series, or in parallel.

6. 3D multi-foldable device of claim 1, wherein the first unit and the second unit are formed in a first line and the third unit and the fourth unit are formed in a second line, the first line and the second line being perpendicular to each other when the 3D multi-foldable device is in an unfolded condition.

7. A three-dimensional (3D) multi-foldable device comprising:

a first unit having a first center panel and a pair of first wing panels, the pair of first wing panels being rotatable by 180° about two parallel edges of the first center panel, the two parallel edges of the first center panel acting as rotation axes for the pair of first wing panels;

a second unit having a second center panel and a pair of second wing panels, the pair of second wing panels being rotatable by 180° about two parallel edges of the second center panel, the two parallel edges of the second center panel acting as rotation axes for the pair of second wing panels, wherein the rotation axes of the second unit are identical to the rotation axes of the first unit;

a third unit having a third center panel and a pair of third wing panels, the pair of third wing panels being rotatable by 180° about two parallel edges of the third center panel, the two parallel edges of the third center panel acting as rotation axes for the pair of third wing panels; and a fourth unit having a fourth center panel and a pair of fourth wing panels, the pair of fourth wing panels being rotatable by 180° about two parallel edges of the fourth center panel, the two parallel edges of the fourth center panel acting as rotation axes for the pair of fourth wing panels, wherein the rotation axes of the fourth unit are identical to the rotation axes of the third unit, wherein the rotation axes of the first and second units are perpendicular to the rotation axes of the third and fourth units, and at least some portions of the pair of the third wing panels are combined with the first and second wing panels at one side of the pairs of the first and second wing panels, and at least some portions of the pair of the fourth wing panels are combined with the first and second wing panels at the other side of the pairs of the first and second wing panels.

8. The 3D multi-foldable device of claim 7, wherein each of the first through fourth units is a rectangle in which a width of each of the first through fourth center panels is equal to a sum of widths of its corresponding pair of the first through fourth wing panels, and the third and fourth units completely overlap with the first and second units when the 3D multi-foldable device is in an unfolded condition.

9. The 3D multi-foldable device of claim 7, wherein, each of the first through fourth units is a rectangle and a width of each of the first through fourth center panels is equal to a sum of widths of a corresponding pair of the first through fourth wing panels, and the third unit overlaps only with first and second wing panels at one side of the pairs of the first and second wing panels and the fourth unit overlaps only with first and second wing panels at the other side of the pairs of the first and second wing panels when the 3D multi-foldable device is in an unfolded condition.

10. The 3D multi-foldable device of claim 7, further comprising:

magnetic materials on at least some portions of contacting surfaces between each of the first through fourth center panels and a corresponding pair of the first through fourth wing panels.

11. The 3D multi-foldable device of claim 7, wherein at least a portion of the first through fourth center panels and the pairs of the first through fourth wing panels includes one of a display panel, a touch screen, and a display panel having a haptic function.

12. The 3D multi-foldable device of claim 7, wherein the multi-foldable device is configured to be used as at least one of a mobile phone, an MPEG audio layer-3 (MP3) player, an audio recorder, a digital multimedia broadcasting (DMB) player, a car navigator, a portable personal computer (PC), a bio healthcare device, a remote controller, a camera, and a camcorder.

13. The 3D multi-foldable device of claim 7, wherein at least a portion of the first through fourth center panels and the pairs of the first through fourth wing panels includes at least one of an antenna, a speaker, a wireless charger, a universal serial bus (USB) device, a clip-type Bluetooth device, a blood pressure meter, a blood glucose meter, a thermometer, a chemical sensor, a solar battery, a self-energy generator, and a radio frequency (RF) device.

14. The 3D multi-foldable device of claim 7, further comprising:

a magnet on one side and a magnetic material on another side of the 3D multi-foldable device so that a plurality of 3D multi-foldable devices are connectable to each other in series or in parallel.

15. A three-dimensional (3D) multi-foldable device comprising:

a first unit having a first center panel with a first edge and a second edge, a first wing panel, and a second wing panel, wherein the first and second edges are parallel to each other, the first wing panel is attached to the first edge of the first center panel such that the first wing panel may be rotated about the first edge by 180 degrees, and the second wing panel is attached to the second edge of the first center panel such that the second wing panel may be rotated about the second edge by 180 degrees, the first edge acting as a first rotation axis for the first wing panel and the second edge acting as a second rotation axis for the second wing panel;

a second unit adjacent to the first unit, the second unit having a second center panel with a third edge and a fourth edge, a third wing panel, and a fourth wing panel, wherein the third and fourth edges are parallel to each other, the third wing panel is attached to the third edge of the second center panel such that the third wing panel may be rotated about the third edge by 180 degrees, and the fourth wing panel is attached to the fourth edge of the second center panel such that the fourth wing panel may be rotated about the fourth edge by 180 degrees, the third edge acting as a rotation axis for the third wing panel and the fourth edge acting as a rotation axis for the fourth wing panel, the first rotation axis being coincident with the rotation axis of the third wing panel and the second axis being coincident with the rotation axis of the fourth wing panel;

a third unit adjacent to the first unit and the second unit, the third unit having a third center panel with a fifth edge and a sixth edge, a fifth wing panel, and a sixth wing panel, wherein the fifth and sixth edges are parallel to each other, the fifth wing panel is attached to the fifth edge of the third center panel such that the fifth wing panel may be rotated about the fifth edge by 180 degrees, and the sixth wing panel is attached to the sixth edge of the third center panel such that the sixth wing panel may be rotated about the sixth edge by 180 degrees, the fifth edge acting as a third rotation axis for the fifth wing panel and the sixth edge acting as a fourth rotation axis for the sixth wing panel, the third rotation axis and fourth rotation axis being perpendicular with the first rotation axis;

a fourth unit adjacent to the third unit, the fourth unit having a fourth center panel with a seventh edge and an eighth edge, a seventh wing panel, and an eighth wing panel, wherein the seventh and eighth edges are parallel to each other, the seventh wing panel is attached to the seventh edge of the fourth center panel such that the seventh wing panel may be rotated about the seventh edge by 180 degrees, and the eighth wing panel is attached to the eighth edge of the fourth center panel such that the eighth wing panel may be rotated about the eighth edge by 180 degrees, the seventh edge acting as a rotation axis for the seventh wing panel and the eighth edge acting as a rotation axis for the eighth wing panel, the rotation axis of the seventh wing panel being coincident with the third rotation axis and the rotation axis of the eighth wing panel being coincident with the fourth rotation axis, wherein at least a portion of the first wing panel is combined with a portion of the fifth wing panel, a portion of the second wing panel is combined with a portion of the seventh wing panel, a portion of the third wing panel is combined with a portion of the sixth wing panel, and a portion of the fourth wing panel is combined with a portion of the eighth wing panel.

16. The 3D multi-foldable device of claim 15, wherein each of the first through fourth units is a rectangle in which a width of the first center panel is equal to the sum of the widths of the first and second wing panels, the width of the second center panel is equal to the sum of the widths of the third and fourth wing panels, the width of the third center panel is equal to the sum of the widths of the fifth and sixth wing panels, and the width of the fourth center panel is equal to the sum of the widths of the seventh and eighth wing panels, and the third and fourth units completely overlap with the first and second units when the 3D multi-foldable device is in an unfolded condition.

17. The 3D multi-foldable device of claim 15, wherein, each of the first through fourth units is a rectangle in which a width of the first center panel is equal to a sum of widths of the first and second wing panels, a width of the second center panel is equal to a sum of widths of the third and fourth wing panels, a width of the third center panel is equal to a sum of widths of the fifth and sixth wing panels, and a width of the fourth center panel is equal to a sum of widths of the seventh and eighth wing panels, and the third unit overlaps only with first and third wing panels and the fourth unit overlaps only the second and fourth wing panels when the 3D multi-foldable device is in an unfolded condition.

18. The 3D multi-foldable device of claim 15, further comprising:

magnetic materials on at least some portions of contacting surfaces between the first center panel and the first and second wing panels, the second center panel and the third and fourth wing panels, the third center panel and the fifth and sixth wing panels, and the fourth center panel and the seventh and eighth wing panels.

19. The 3D multi-foldable device of claim 15, further comprising:

a magnet on one side and a magnetic material on another side of the 3D multi-foldable device so that a plurality of 3D multi-foldable devices are connectable to each other in series, or in parallel.

20. The 3D multi-foldable device of claim 15, wherein the first unit and the second unit are formed in a first line and the third unit and the fourth unit are formed in a second line, the first line and the second line being perpendicular to each other when the 3D multi-foldable device is in an unfolded condition.

* * * * *